United States Patent
Desmarais et al.

[15] 3,650,346
[45] Mar. 21, 1972

[54] STEERING CONTROL

[72] Inventors: Joseph C. B. Desmarais, RFD #2 Bible Hill; Richard W. Beaumont, 3 Clifton Avenue, both of Claremont, N.H. 03743

[22] Filed: Mar. 12, 1969

[21] Appl. No.: 806,460

[52] U.S. Cl. ...................................... 180/79.2 B, 180/51
[51] Int. Cl. ............................................. B62d 5/08
[58] Field of Search ........................... 180/79.2 B, 79.2

[56] References Cited

UNITED STATES PATENTS

Re.26,802  2/1970  Symons et al. ............. 180/79.2 B
3,159,230  12/1964  Gordon ....................... 180/79.2 B

*Primary Examiner*—A. Harry Levy
*Attorney*—E. Wallace Breisch

[57] ABSTRACT

A steering control for center pivot or frame steering vehicles wherein the vehicles are steered by hydraulic cylinders interposed between relatively pivotable front and rear portions of the vehicle frame. Fluid flow to these cylinders is controlled for extension and retraction by a steering valve having a handle or tiller mounted in mechanical connection with the pivotable frame portions so that steering is accomplished by pushing the tiller in the direction toward which it is desired to steer and the angle of the tiller with respect to the front frame portion is the same as the angle of the rear frame portion with respect to the front frame portion and consequently the tiller position constantly indicates the steering attitude of the two frame portions.

5 Claims, 8 Drawing Figures

Patented March 21, 1972
3,650,346
2 Sheets-Sheet 1
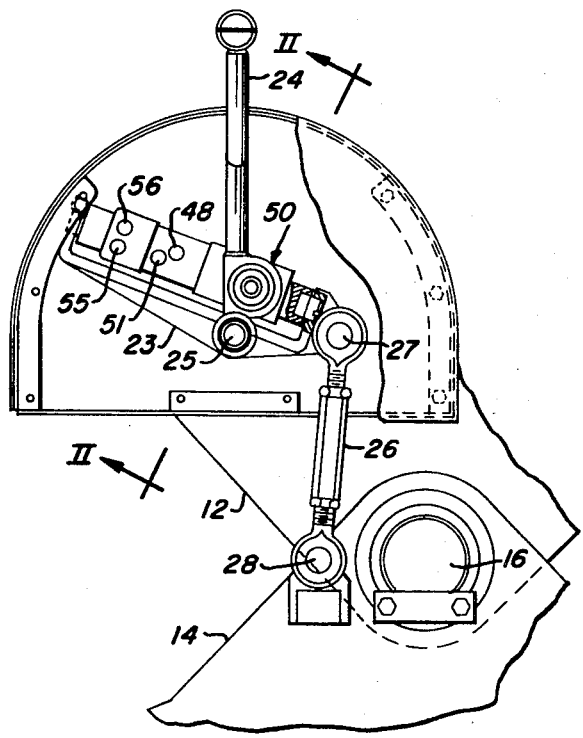
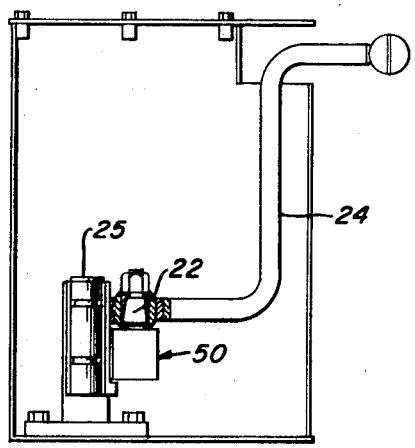
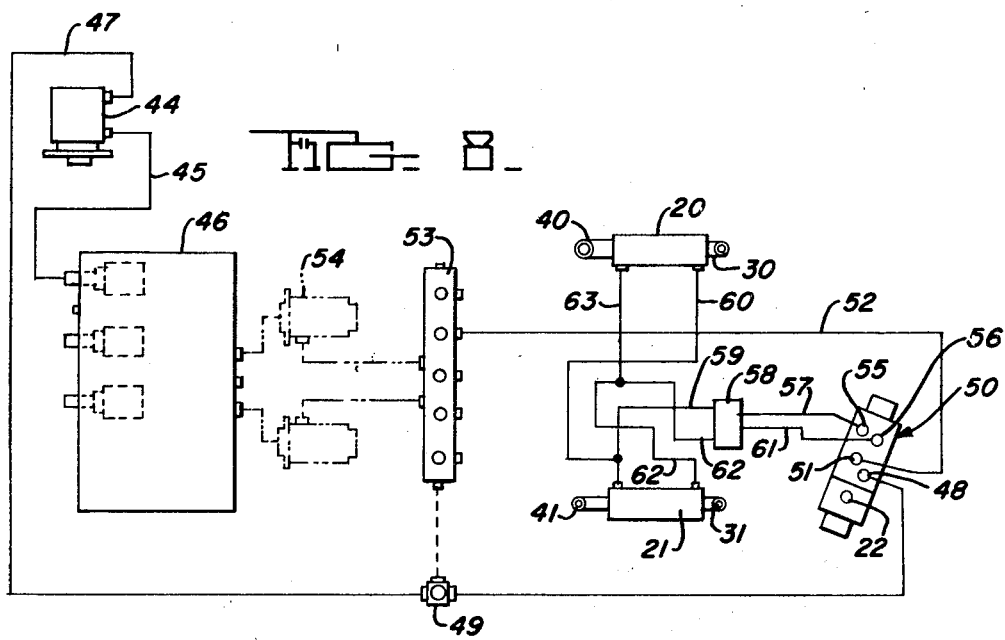
INVENTORS
JOSEPH C.B. DESMARAIS
& RICHARD W. BEAUMONT Patented March 21, 1972
3,650,346
2 Sheets-Sheet 2
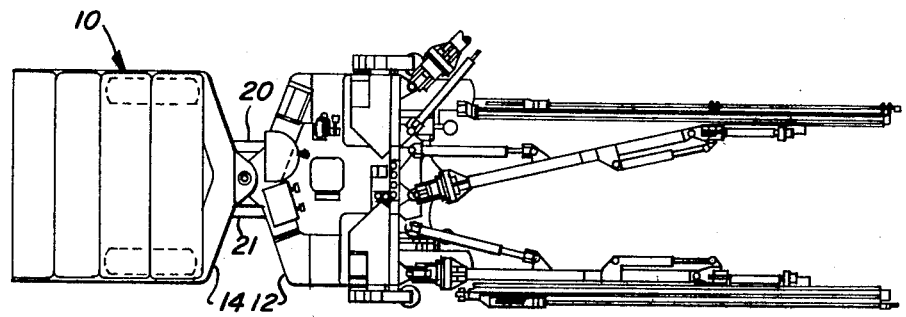
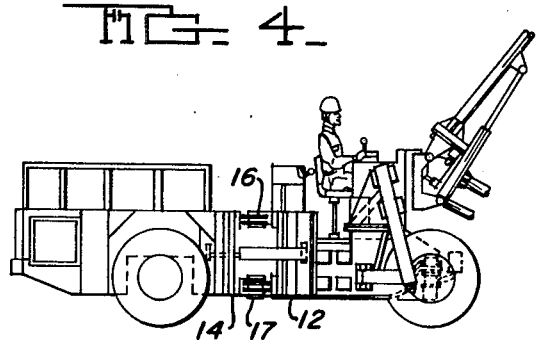
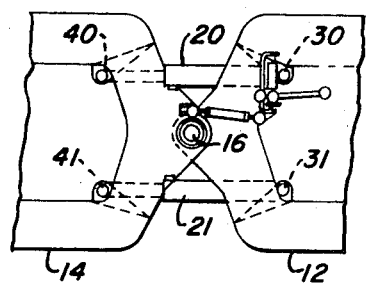
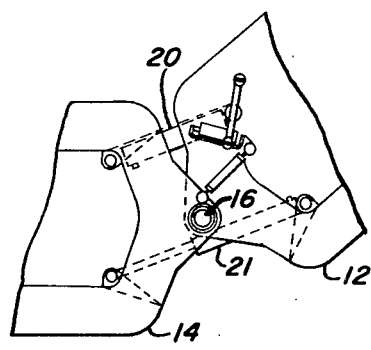
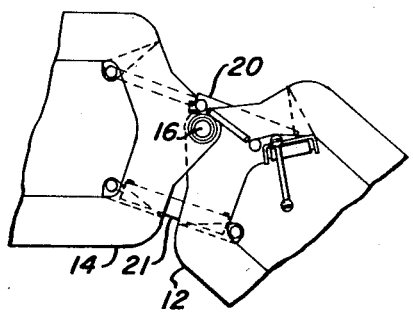
INVENTORS
JOSEPH C.B. DESMARAIS
& RICHARD W. BEAUMONT

STEERING CONTROL

The steering control of this invention is hereinafter to be described and shown as applied to a frame steer vehicle designed to transport and control a plurality of drills mounted on elongated booms and guide frames and referred to as a drillmobile. It is however to be realized that the steering control of this invention would be applicable to any frame steer vehicle and most particularly useful where heavy front end loading is coupled with the requirement for good maneuverability at slow speeds such as found in drillmobiles, high lifts, load haul dump vehicles and like apparatus.

The advantages resident in the steering control of this invention are as follows:

The steering lever or tiller moves only as many degrees as the front frame moves relative to the rear frame, a total of 80° or 90°, while with conventional steering wheel arrangements such an amount of steering angle might require as much as four to seven turns of the wheel to go from hard left to hard right steering angle;

The tiller serves as an indicator showing the relative angular position of the two frame portions;

The tiller always points in the direction the vehicle is steering toward;

The frame portions are always locked at the angle in which the tiller has been positioned;

If the power steering is overcome by external forces the tiller will move accordingly and still indicate the relative angular positioning of the two frame portions.

These and other advantages and objects of this invention will be more readily apparent on consideration of the following description and drawings in which:

FIG. 1 is a fragmentary plan view of a central portion of a vehicle showing a steering control constructed according to the principles of this invention;

FIG. 2 is a sectional view taken substantially on line 2—2 of FIG. 1;

FIG. 3 is a top plan view of a frame steer vehicle comprising a steering control constructed according to the principles of this invention;

FIG. 4 is a side elevational view of the vehicle of FIG. 3;

FIG. 5 is a schematic representation of two frame portions pivotally connected and provided with a steering control constructed according to the principles of this invention shown in a configuration for straight ahead travel;

FIG. 6 is a schematic representation similar to FIG. 5 showing the frame portions of FIG. 5 is a configuration for hard left steering angle;

FIG. 7 is a schematic representation similar to those of 5 and 6 but shows the two frame portions in a configuration for hard right steer;

FIG. 8 is a schematic circuit diagram showing hydraulic connections for the steering control of this invention.

Referring now to the drawings, FIG. 3 shows a plan view of a drillmobile 10 having relatively pivoted front and rear frame portions 12 and 14, respectively, supported on forward and rearward pairs of wheels, respectively, for motion over a surface such as the ground or the floor of a tunnel and pivotally connected together by a pair of centrally located, vertically spaced coaxial pivot pins 16 and 17, upper and lower respectively, as best seen in FIG. 4. A pair of elongated fluid actuated hydraulic steering cylinders 20 and 21, left and right, respectively, are pivotally connected to the frame portions 12 and 14 at equal distances on either side of the longitudinal centerline of the vehicle 10 to provide, when activated, steering action for the vehicle 10 in a well known manner. As best seen in FIG. 5 the head end 30 of cylinder 20 and the head end 31 of cylinder 21 are pivotally connected to the front frame portion 12 while the respective rod ends 40 and 41 of the cylinders 20 and 21 are similarly pivotally connected to the rear frame portion 14. As best seen in FIG. 8 the head end 30 of cylinder 20 is hydraulically connected to communicate with and be commonly pressurized with the rod end 41 of the cylinder 21. In similar manner it will be seen that rod end 40 of the cylinder 20 is interconnected and simultaneously pressurizable with the head end 31 of the cylinder 21 so that in a familiar manner pressurization of one head end is accompanied by pressurization of the other rod end so that when, for instance, cylinder 20 is extending, cylinder 21 will be contracting simultaneously. Such arrangements are well known in the power steering art where frame steer vehicles are concerned and it is to be realized that although a pair of cylinders is herein shown and described a single cylinder at one side of the centerline can be used to replace these two cylinders in case the forces to be encountered are not great enough to justify the use of two cylinders as herein described, without departing from the principles of this invention.

Referring again to FIG. 8 it will be seen that a suitably powered hydraulic pump 44 is connected by a line 45 with a tank 46 or other source of hydraulic fluid so that operation of the pump 44 removes hydraulic fluid, hereinafter designated oil, from the tank 46 and supplies it under pressure to a line 47 communicating through a relief valve 49 with an inlet port 48 in a control valve means such as an open center power steering valve 50, hereinafter more fully described. A return line 52 communicates between an outlet connection 51 of the valve 50 and a return oil manifold 53, which in turn communicates through a suitable filter 54 with the tank 46 by means of conventional connections as well known. The valve 50 is also provided with a right steer connection 55 and a left steer connection 56 which are connected as follows: right steer connection 55 communicates by way of a line 57 and a double pilot operated check valve 58 and fluid conducting lines 59 and 60 with the rod end 41 of cylinder 21 and the head end 30 of cylinder 20 so that oil flowing under pressure through the line 57 will pressurize the head end 30 and cause extension of the left cylinder 20 and will simultaneously pressurize rod end 41 causing contraction of the right hand cylinder 21 to cause the front frame 12 to swing to the right relative to the rear frame 14 as seen in FIG. 7. In a similar way the left steer connection 56 communicates by way of a line 61 through the check valve 58 by way of lines 62 and 63 with the rod end 40 of the cylinder 20 and the head end 31 of the cylinder 21 so that oil flowing under pressure through the line 61 will effect left steering, as shown in FIG. 6, in a similar manner.

The double pilot operated check valve 58 is of a well known type so constructed that when neither of the lines 57 and 61 is pressurized both of the lines 59 and 62 are blocked by the check valve 58 and no oil can flow out of either of the cylinders 20 and 21. However when either line 61 or 57 is pressurized, the passageways through check valve 58 are opened so that oil can flow from the pressurized line into the cylinders 20 and 21 and simultaneously oil can flow outwardly from those cylinders through the valve 50 to the tank 46.

The valve 50 is a typical power steering valve of the elongated spool type having a lengthwise movable valve spool therein (not shown) of a well known type which is connected to a control stud 22 best seen in FIG. 2, which can be used to move the spool lengthwise from its spring biased center position by the action of a valve handle or lever type steering tiller 24 as hereinafter made plain. Movement of the control stud 22 and consequently of the internal spool to the left as seen in FIG. 1 communicates the left steer connection 56 with the inlet connection 48 and simultaneously effects communication of the right steer connection 55 with the outlet connection 51 to cause the left steer action hereinabove described. In like manner movement of the tiller 24 to the right will move the stud 22 and the internal spool to the right and reverse the connections to that inlet connection 48 is now in communication with the right steer connection 55 while the outlet 51 communicates with the left steer connection 56, internally of the valve 50.

To produce steering angle indication by the tiller 24, the valve 50 is mounted on a bracket 23 in turn pivotally mounted on a pin 25 suitably rigidly secured to an upper surface portion of the front frame 12. The tiller arm 24 similarly pivots or swings about the pivot pin 25 as best seen in FIG. 2. Motion of the valve 50 and tiller 24 about the pivot pin 25 is controlled by a tie rod 26 pivotally connected at one end to a pivot pin 27 on one end of valve bracket 23 and at the other end to a pivot pin 28 rigidly mounted at a suitable point on a forward end of the rear frame portion 14. The tie rod 26 is made adjustable in length so that the tiller lever 24 may be adjusted to be in a straight forward position when the frames 12 and 14 are in alignment on a common centerline, by adjusting the length of the link 26. It is to be noted that the distance of the pivot pin 25 from the center of pivot pin 27 at the forward end of the link 26 must be equal to the distance from the center of pin 16 to the center of the pivot pin 28 at the rear frame end of the tie rod and pivot pins 16, 25, 27 and 28 must have parallel axes in order to produce the following operation.

Referring now to FIG. 1 and starting from the position shown in FIG. 5 with the front and rear frames 12 and 14 respectively aligned on a common centerline and the tiller 24 parallel to that centerline, swinging the tiller arm 24 to the right carries the spool to the right within the valve 50 and pressurizes the right steer connection 55 so that the cylinders 20 and 21 are activated, as above described, swinging to produce an angle between the front frame 12 and the rear frame 14 to the right as shown in FIG. 7 and whatever number of degrees of rotation or swing is produced between the frames 12 and 14 the same number of degrees of swing will be also applied to the tiller 24 with relation to the longitudinal centerline of the front frame 12 to indicate the angular relationship of the frames 12 and 14. If pressure is maintained against the tiller 24 for a period of time, swinging it to the right, the valve 50 will "chase" the spool as it is moved to the right by the stud 22 until maximum steer angle of the frame portions 12 and 14 has been produced by the cylinders 20 and 21 as seen in FIG. 7. As soon as swing force against the tiller 24 is released, at any point within the operable limits, spring means within the valve 50 will center the spool to bring the steering into neutral with no pressure on either connection 55 or 56 so that the check valve 58 will hold the cylinders locked in the condition obtaining at that time and will so remain until the tiller is activated either to the left or the right. In a similar manner swinging the tiller to the left causes left steer and equiangular left steer indication in the same manner with the tiller indicating the same angle with respect to the longitudinal centerline of the front frame 12 as the angle that centerline makes with respect to the longitudinal centerline of the rear frame 14 at that same time.

Thus one method of steering according to this invention comprises the steps of: producing steering action of a desired number of degrees (swinging the front frame portion 12) in a desired direction by rotating (swinging) a steering handle an equal number of degrees in the direction of such desired steering action; producing a desired amount of further steering action in said desired direction by further equiangular swinging of said steering handle in said desired direction; locking said steering action by ceasing to swing said handle, reversing said steering action by swinging said handle in the direction opposite said desired direction to produce equiangular handle swing and steering action (frame swing) in said opposite direction.

It is to be noted that steering angle indication by the structure of this invention includes making the interaxis distances, 25 to 27, and 28 to 16 of ratio lengths so that the tiller 24 swings proportionally with respect to the angular amount of frame swing.

A preferred embodiment of the principles of this invention having hereinbefore been shown and described it is to be realized that variations in the structure for accomplishing those principles are to be expected without departing from the scope of this invention. It is therefore respectfully requested that this invention be interpreted as broadly as possible.

What is claimed is:

1. In a frame steer vehicle of the type having a pair of pivotally connected frame portions, at least one fluid actuated extensible cylinder pivotally connected to both frame portions for pivoting one frame portion relative to the other about a frame pivot connection and a hydraulic circuit to provide pressure fluid for extension and retraction of said at least one cylinder, the improvement comprising, a steering control including; control valve means in said circuit including at least two relatively movable elements, one of said elements being pivotally mounted on one of said frame portions, means mechanically connecting said one element to said other frame portion for pivoting movement of said valve means relative to said one frame portion in proportion to the relative pivoting motion of said frame portions and valve operating handle means pivotally mounted on said one frame portion and being pivotable with the other of said movable elements to selectively move and move with said other element.

2. A frame steer vehicle as specified in claim 1 wherein said one element is an elongated spool valve having a hollow body portion and said other element is a relatively movable valve spool therewithin and said handle means controls said relative movement of said elements.

3. A frame steer vehicle as specified in claim 2 wherein said spool is spring biased to a neutral centered position within said body by spring means mounted in said body.

4. A frame steer vehicle as specified in claim 3 wherein said mechanical connecting means is a link having one end pivotally connected to said hollow body portion at a given distance from said valve means pivot mounting and the other end pivotally connected to said other frame portion at a distance equal to said given distance from said frame pivot connection to provide equiangular pivoting of said valve means and said frame portions.

5. A frame steer vehicle as specified in claim 1 wherein said mechanical connecting means is pivotally connected at both ends and is adjustable in length to make said handle parallel to the centerline of said front frame at straight ahead steering configuration.

* * * * *